United States Patent Office 3,520,929
Patented July 21, 1970

3,520,929
HEXAFLUORO-2-PROPANOL-2-AMINES
Lester L. Maravetz, Clark Union, and Samuel T. Morneweck, Linden Union, N.J., assignors to Esso Research and Engineering Company, a corporation of Delaware
No Drawing. Filed Oct. 19, 1966, Ser. No. 587,659
Int. Cl. C07c 91/06, 91/08, 91/16
U.S. Cl. 260—570.5
15 Claims

ABSTRACT OF THE DISCLOSURE

Halogenated carbonyl compounds, such as hexafluoroacetone, for example, can be reacted with certain substituted amines to yield compositions of matter which have herbicidal and fungicidal activity said compositions of matter represented by the following structure:

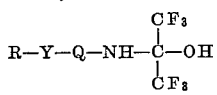

wherein R is selected from the group consisting of hydrogen, $C_1$ to $C_{20}$ alkyl, phenyl and chloro-substituted phenyl; Y is selected from the group consisting of O, S and $NR_1$ wherein $R_1$ is hydrogen or an alkyl containing from 1 to 4 carbon atoms; Q is $C_nH_{2n}$ wherein $n$ equals 2, 3 or 4.

---

This invention relates to new compositions of matter, and, more particularly, the invention concerns compounds which are useful as herbicides and fungicides.

The compositions of this invention have the following general formula:

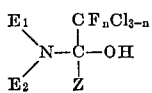

Formula 1 where:
(I) Z is H or —$CF_nCl_{3-n}$
(II) $n$ is an integer from 0 to 3
(III) $E_1$ may be H or an Organic Residue, preferably H.

"Organic Residue" as used herein shall mean a moiety selected from the group consisting of a $C_1$–$C_{20}$ aliphatic hydrocarbon; a $C_1$–$C_{20}$ alkene; a $C_1$–$C_{20}$ alkyne; a phenyl group; a naphthenyl group; a $C_3$–$C_{10}$ alicyclic hydrocarbon; a $C_2$–$C_7$ heterocyclic containing at least one heteroatom selected from the group consisting of oxygen, nitrogen, and sulfur; and substituted derivatives of the aforementioned moieties, which substituents are selected from the group consisting of $C_1$–$C_{10}$ alkyl, fluorine, chlorine, bromine, iodine, nitro group, amino group, cyano group, and $C_1$–$C_5$ alkoxy group.

"Preferred Organic Residue" as used herein shall means a moiety selected from the group consisting of $C_1$–$C_6$ aliphatic hydrocarbon; $C_1$–$C_6$ alkene; $C_1$–$C_6$ alkyne; $C_3$–$C_{10}$ alicyclic; $C_2$–$C_7$ heterocyclic rings containing one or more hetero-atoms selected from the group consisting of oxygen, nitrogen and sulfur; and substituted derivatives of the aforementioned moieties, which substituents are selected from the group consisting of $C_1$–$C_4$ alkyl, fluorine, chlorine, bromine, iodine, nitro group, amino group, cyano group, and $C_1$–$C_5$ alkoxy groups.

The alkenes, alkynes, and aliphatic hydrocarbons referred to in the above definitions may have straight chains or branched chains. Examples of the aforementioned $C_3$–$C_{10}$ alicyclics include cyclopropyl, cyclobutyl, etc.

(IV) $E_2$ may be (1) H, (2) an Organic Residue, (3) 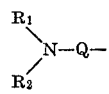

where $R_1$ and $R_2$ are H or Organic Residues and Q is a straight or branched alkylene chain containing from 1 to 6 carbon atoms;

(4)      $R_1$—X—$NR_2$—Q— where $R_1$ and $R_2$ are H or an Organic Residue; Q is a straight or branched alkylene chain containing 1 to 6 carbon atoms; and X is selected from the group consisting of

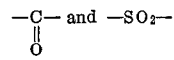

or (5)      $R_1$—Y—Q— where $R_1$ is an Organic Residue; Y is O or S; Q is a straight or branched alkylene chain containing from 1 to 6 carbon atoms.

(V) $E_1$ and $E_2$ may form a ring containing atoms selected from the group consisting of carbon atoms, oxygen atoms, nitrogen atoms, sulfur atoms, and combinations of the aforementioned atoms. Examples of these ring compounds are given in Table I. See Compounds 11, 17 and 34 in Table I.

The compounds of this invention are prepared by reacting halogenated ketones and aldehydes with four classes of substituted mono- and diamines. The compositions of the invention have herbicidal and fungicidal activity and are particularly effective as pre-emergence herbicides.

The carbonyl compounds suitable for preparing the compounds of the invention have the following formula:

Formula 2 where $n$ is an integer of from 0 to 3 and Z is H or —$CF_nCl_{3-n}$. Suitable amines include:

Class 1.—Substituted diamines of the following formula:

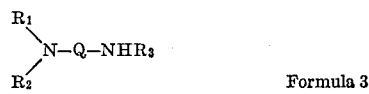

Formula 3 where Q is a straight or branched alkylene chain containing from 1 to 6 carbon atoms; $R_1$, $R_2$, and $R_3$ are H or an Organic Residue. In addition, $R_1$ and $R_2$ may form a ring containing only carbon atoms or containing carbon atoms and one or more hetero-atoms selected from the group consisting of oxygen, nitrogen and sulfur. Compounds 4, 6, 7, 27, 33, and 45 listed in Table I are examples of compounds prepared using the substituted diamines of Class 1 wherein $R_1$ and $R_2$ form a ring structure. Also in Table I, a number of other compounds are listed which were prepared by reacting a substituted diamine of Class 1 with a carbonyl compound described by Formula 2. The numbers of those compounds, as listed in Table I, are as follows: 1, 4–10, 11, 12, 14–16, 18–28, 30–33, 36, 39, 42, 44–46, and 50;

Class 2.—Substituted diamines having the following formula:

$R_1$—X—$NR_2$—Q—$NHR_3$      Formula 4 where Q, $R_1$, $R_2$ and $R_3$ are the same as in Class 1 above and X may be

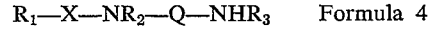

Compounds 35 and 38 listed in Table I are examples of compounds in this invention prepared by reacting a substituted diamine of Class 2 with a carbonyl compound described by Formula 2;

Class 3.—Monoamines of the formula:

where $R_1$ and $R_2$ are H, an Organic Residue, or may form a ring containing atoms selected from the group consisting of carbon atoms, oxygen atoms, nitrogen atoms, sulfur atoms, and combinations of the aforementioned atoms. Examples of compounds prepared by reacting monoamines of Class 3 with carbonyl compounds described by Formula 2 are numbered in Table I as follows: 2, 11, 17, 29, 34, 40, 48, 51, 59, and 60; and Class 4.—Monoamines of the type $R_1$—Y—Q—$NHR_2$ (Formula 6) where $R_1$ and $R_2$ are H or an Organic Residue; Q is a straight or branched alkylene chain containing from 1 to 6 carbon atoms, and Y is —S— or —O—. Compounds 3, 13, 37, 41, 43, 47, 49, and 52–58, listed in Table I, are examples of the compounds of this invention prepared by reacting a monoamine of Class 4 with a cabonyl described in Formula 2.

It is thus seen that when the Class 1 substituted diamines (Formula 3) are reacted with the carbonyl compounds described by Formula 2, $E_1$ and $E_2$ of Formula 1 will be $R_3$ and

respectively. When the Class 2 substituted diamines (Formula 4) are reacted with the compound described by Formula 2, $E_1$ and $E_2$ of Formula 1 will be $R_3$ and $R_1XNR_2Q$—, respectively. When Class 3 monoamines (Formula 5) are reacted with carbonyl compounds of Formula 2, $E_1$ and $E_2$ of Formula 1 will be $R_1$ and $R_2$, respectively, and when Class 4 monoamines described by Formula 6 are reacted with carbonyl compounds of Formula 2, $E_1$ and $E_2$ of Formula 1 will be $R_2$ and $R_1$—Y—Q, respectively.

The compounds of the invention are prepared by reacting the carbonyl compound with an amine at a temperature of from —100° C. to 100° C., preferably at a temperature of from —60° C. to 0° C. The reaction proceeds at atmospheric pressure but any pressure of from 0 to 450 p.s.i.a. may be employed. Some of the compounds may be prepared by reacting a carbonyl and an amine for as short a time as 0.1 hour. Depending upon the choice of reactants and the reaction conditions, it may take as long as 100 hours. Ordinarily, however, the reaction should take no longer than 24 hours. The reactants may be employed in a ratio of carbonyl compound to amine of from 10:1 to 1:10. It is preferred, however, that the mole ratio of carbonyl to amine be within the range of from 1.1:1 to 1:1.1. Various solvents are suitable. Diethyl ether, chloroform, acetone have been utilized effectively. In addition, heptane, benzene, toluene, and the like, should be suitable.

Alternatively, the carbonyl and water can be contacted in equimolar amounts. The product of this reaction is further reacted with an amine. The structure of the product of the reaction between the carbonyl and water is not known; however, the product resulting from the reaction between the intermediate product and the amine is believed to be the same as the product of the aforementioned direct reaction between the carbonyl and the amine. It is possible, however, that the latter reaction yields a salt rather than a covalent structure. It is also possible that the product prepared by the former reaction is converted to a salt when contacted with moisture.

The following examples illustrate the method of preparing the compounds of this invention.

EXAMPLE 1

Hexafluoroacetone (83 grams) was allowed to vaporize into a solution of N,N-dimethyl-1,3-propanediamine (60 grams) in dry ether (200 ml.) while the solution temperature was held at —50° C. After addition, the solution was allowed to warm and the solvent was removed under vacuum. The gummy product was recrystallized from ether to give a white solid, melting point 62.5 to 63.5° C., having a nitrogen content of 9.80; calculated nitrogen content was 9.09. The product was 2-[3-(dimethylamino)propylamino]-hexafluoro-2-propanol.

EXAMPLE 2

N-phenylethylenediamine (13.6 grams) was dissolved in 200 ml. of anhydrous ether in a flask equipped with stirrer, thermometer, and Dry Ice condenser. A blanket of nitrogen gas was maintained above the solution. The solution was stirred and cooled to approximately —50° C. and hexafluoroacetone (18.5 grams) was added to the cold solution. After the addition was complete, the solution was stirred until room temperature was attained. Evaporation of the solvent yielded 31.7 grams of crude crystalline tan colored product. Recrystallization of the crude material from chloroform gave a white product, M.P. 185–189° C. The material was hexafluoro-2-[2-(phenylamino)ethylamino]-2-propanol. Fluorine analysis: calculated 37.7; found 37.4.

EXAMPLE 3

A solution of N-methyl-1,3-propanediamine (5.32 grams) in 170 ml. of anhydrous ether was placed in a flask equipped with thermometer, stirrer, and Dry Ice condenser. An atmosphere of nitrogen gas was maintained above the solution. The solution was cooled to approximately —50° C. and hexafluoroacetone (10 grams) was allowed to vaporize into the cold solution. The solution was stirred until room temperature was attained and evaporation of the ether yielded a crude while solid. The material was washed with petroleum ether and dried on a filter. A yield of 15.6 grams of hexafluoro-2-[3-methylamino)-propylamino]-2-propanol was obtained. Melting point was 127–129° C. Fluorine analysis: calculated 44.8; found 44.8.

EXAMPLE 4

The compound of Example 1 was prepared by the alternate method described above. A flask was charged with two-tenths mole of water and two-tenths mole plus 10% excess of hexafluoroacetone. The flask temperature was maintained between 40 and 45° C. with stirring. The reaction was mildly exothermic. One-tenth mole of a liquid product of this reaction which was assumed to be a monohydrate of hexafluoroacetone was dissolved in 100 ml. of ether and one-tenth mole of N,N-dimethyl-1,3-propanediamine was added dropwise to the mixture. The temperature was held between 25 and 28° C. during the course of the addition. After the addition was completed, the mixture was allowed to stir for 60 minutes during which time white solids formed. The mixture was cooled and the solids filtered. The white product had a melting point of 63.5° C. A mixed melting point test with a compound prepared in Example 1 gave no depression. The infrared spectra of this product and the product of Example 1 were identical.

EXAMPLE 5

A compound of this invention was prepared with a Class 3 amine. A flask equipped with a Dry Ice condenser and thermometer was charged with 1-phenyl-2-methylpiperazine (10 grams, 0.0568 mole) dissolved in 220 ml. of anhydrous ether. The stirred solution was cooled to approximately —40° C. and hexafluoroacetone (9.44 grams, 0.0568 mole) was passed into the amine solution. A nitrogen atmosphere was maintained above the ether solution during the reaction. The solution was allowed to attain room temperature and the ether was vaporized in air. A crude faintly yellow solid product weighing 22 grams was obtained. The material was washed with petroleum ether to give tan crystals having a melting point of 84–88° C. Upon analysis, the carbon, hydrogen and fluorine contents were 46.89%, 5.14% and 32.5%, respectively. The calculated carbon, hydrogen and fluorine contents were 49.1%, 4.71% and 33.3%, respectively.

EXAMPLE 6

A compound of this invention was prepared utilizing a Class 2 amine. A solution of N-benzoyl-1,3-propanediamine (17.8 grams, 0.10 mole) in 200 ml. of acetone was placed in a flask equipped with a Dry Ice condenser and thermometer. A nitrogen atmosphere was maintained above the solution as the solution was cooled to −60° C. Hexafluoroacetone was passed into the cold solution with stirring. Upon warming the stirred solution to room temperature, the acetone was removed at reduced pressure. The viscous, clear, oil residue was held under vacuum at approximately 1 mm. for a short time. The clear yellow gum thus obtained contained carbon, hydrogen and fluorine in the following percentages: 46.93%, 4.37%, and 31.7%, respectively. The calculated carbon, hydrogen and fluorine contents were 45.3%, 4.07% and 33.15%, respectively.

The following examples describe the method of preparing the compounds listed in Table I:

EXAMPLE 7

Compound 2 was prepared by reacting diethylamine with hexafluoroacetone. The product was analyzed and found to have the following formula:

$(C_2H_5)_2NC(CF_3)_2OH$

EXAMPLE 8

Compound 3 was prepared by reacting 3-methoxypropylamine with hexafluoroacetone. The product was analyzed and found to have the following formula: $H_3CO(CH_2)_3NHC(CF_3)_2OH$.

EXAMPLE 9

Compound 4 was prepared by reacting N-(3-aminopropyl)-morpholine with hexafluoroacetone. The product was analyzed and found to have the following formula:

EXAMPLE 10

Compound 5 was prepared by reacting N,N-bis(2-hydroxyethyl)-1,3-propanediamine with hexafluoroacetone. The product was analyzed and found to have the following formula:

$(HOCH_2CH_2)_2N—(CH_2)_3NHC(CF_3)_2OH$

EXAMPLE 11

Compound 6 was prepared by reacting N-methyl-N'-(3-aminopropyl)-piperazine with hexafluoroacetone. The product was analyzed and found to have the following formula:

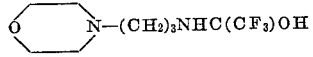

EXAMPLE 12

Compound 7 was prepared by reacting N-(3-aminopropyl)-piperidine with hexafluoroacetone. The product was analyzed and found to have the following formula:

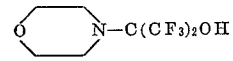

EXAMPLE 13

Compound 8 was prepared by reacting N,N-diethyl ethylenediamine with hexafluoroacetone. The product was analyzed and found to have the following formula: $(C_2H_5)_2NCH_2CH_2NHC(CF_3)_2OH$.

EXAMPLE 14

Compound 9 was prepared by reacting N-(1,1-dimethylethyl)-1,3-propanediamine with hexafluoroacetone. The product was analyzed and found to have the following formula: $(CH_3)_3CNH(CH_2)_3NHC(CF_3)_2OH$.

EXAMPLE 15

Compound 10 was prepared by reacting N,N-dimethyl-ethylenediamine with hexafluoroacetone. The product was analyzed and found to have the following formula: $(CH_3)_2NCH_2CH_2NHC(CF_3)_2OH$.

EXAMPLE 16

Compound 11 was prepared by reacting N-methyl-piperazine with hexafluoroacetone. The product was analyzed and found to have the following formula:

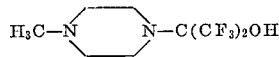

EXAMPLE 17

Compound 12 was prepared by reacting N,N-diethyl-1,3-propanediamine with hexafluoroacetone. The product was analyzed and found to have the following formula: $(C_2H_5)_2N(CH_2)_3NHC(CF_3)_2OH$.

EXAMPLE 18

Compound 13 was prepared by reacting 3-tridecyloxy-propylamine with hexafluoroacetone. The product was analyzed and found to have the following formula:

$C_{13}H_{27}O(CH_2)_3NHC(CF_3)_2OH$

EXAMPLE 19

Compound 14 was prepared by reacting N-phenyl-ethylenediamine with hexafluoroacetone. The product was analyzed and found to have the following formula:

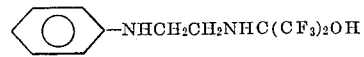

EXAMPLE 20

Compound 15 was prepared by reacting N-methylethylenediamine with hexafluoroacetone. The product was analyzed and found to have the following formula:

$H_3CNHCH_2CH_2NHC(CF_3)_2OH$

EXAMPLE 21

Compound 16 was prepared by reacting N,N-dimethyl-1,3-propanediamine with 1,1,1-trifluoroacetone. The product was analyzed and found to have the following formula: $(CH_3)_2N(CH_2)_3NHC(CH_3)(CF_3)OH$.

EXAMPLE 22

Compound 17 was prepared by reacting morpholine with hexafluoroacetone. The product was analyzed and found to have the following formula:

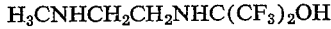

EXAMPLE 23

Compound 18 was prepared by reacting N-ethyl-ethylenediamine with hexafluoroacetone. The product was analyzed and found to have the following formula:

$H_5C_2NHCH_2CH_2NHC(CF_3)_2OH$

EXAMPLE 24

Compound 19 was prepared by reacting N,N-bis(1-methylethyl) ethylenediamine with hexafluoroacetone. The product was analyzed and found to have the following formula: $[(CH_3)_2CH]_2NCH_2CH_2NHC(CF_3)_2OH$.

EXAMPLE 25

Compound 20 was prepared by reacting N-(n-propyl) ethylenediamine with hexafluoroacetone. The product was analyzed and found to have the following formula:

$C_3H_7NHCH_2CH_2NHC(CF_3)_2OH$

EXAMPLE 26

Compound 21 was prepared by reacting N-(1-methylethyl)-ethylenediamine with hexafluoroacetone. The product was analyzed and found to have the following formula: $(CH_3)_2CHNHCH_2CH_2NHC(CF_3)_2OH$.

EXAMPLE 27

Compound 22 was prepared by reacting N-ethyl-1,3-propanediamine with hexafluoroacetone. The product was analyzed and found to have the following formula:

$$H_5C_2NH(CH_2)_3NHC(CF_3)_2OH$$

EXAMPLE 28

Compound 23 was prepared by reacting N-(1-methylethyl)-1,3-propanediamine with hexafluoroacetone. The product was analyzed and found to have the following formula: $(CH_3)_2CHNH(CH_2)_3NHC(CF_3)_2OH$.

EXAMPLE 29

Compound 24 was prepared by reacting N-methyl-1,3-propanediamine with hexafluoroacetone. The product was analyzed and found to have the following formula:

$$H_3CNH(CH_2)_3NHC(CF_3)_2OH$$

EXAMPLE 30

Compound 25 was prepared by reacting N,N-diethyl-N'-methyl-ethylenediamine with hexafluoroacetone. The product was analyzed and found to have the following formula:

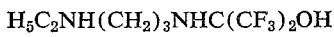

EXAMPLE 31

Compound 26 was prepared by reacting $N^1,N^1$-dimethyl-1,2-propanediamine with hexafluoroacetone. The product was analyzed and found to have the following formula:

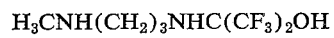

EXAMPLE 32

Compound 27 was prepared by reacting N-(2-aminoethyl)-morpholine with hexafluoroacetone. The product was analyzed and found to have the following formula:

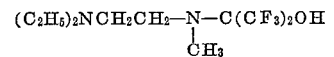

EXAMPLE 33

Compound 28 was prepared by reacting 2,2-dimethyl-2-(diethylamino)ethylamine with hexafluoroacetone. The product was analyzed and found to have the following formula: $(C_2H_5)_2NC(CH_3)_2CH_2NHC(CF_3)_2OH$.

EXAMPLE 34

Compound 29 was prepared by reacting m-chlorobenzylamine with hexafluoroacetone. The formula of the product is shown in Table I.

EXAMPLE 35

Compound 30 was prepared by reacting N-(o-chlorophenyl)-1,3-propanediamine with hexafluoroacetone. The formula of the product is shown in Table I.

EXAMPLE 36

Compound 31 was prepared by reacting N,N-dipropyl-1,3-propanediamine with hexafluoroacetone. The formula of the product is shown in Table I.

EXAMPLE 37

Compound 32 was prepared by reacting N-butyl-1,3-propanediamine with hexafluoroacetone. The formula of the product is shown in Table I.

EXAMPLE 38

Compound 33 was prepared by reacting N-(2-aminoethyl)-piperidine with hexafluoroacetone. The formula of the product is shown in Table I.

EXAMPLE 39

Compound 34 was prepared by reacting 2-methyl-1-phenylpiperazine with hexafluoroaectone. The formula of the product is shown in Table I.

EXAMPLE 40

Compound 35 was prepared by reacting N-benzoyl-1,3-propanediamine with hexafluoroacetone. The formula of the product is shown in Table I.

EXAMPLE 41

Compound 36 was prepared by reacting $N^2,N^2$-dimethyl-1,2-propanediamine with hexafluoroacetone. The formula of the product is shown in Table I.

EXAMPLE 42

Compound 37 was prepared by reacting 3-methoxypropylamine with chloropentafluoroacetone. The formula of the product is shown in Table I.

EXAMPLE 43

Compound 38 was prepared by reacting N-acetyl-N-methyl-1,3-propanediamine with hexafluoroacetone. The formula of the product is shown in Table I.

EXAMPLE 44

Compound 39 was prepared by reacting N-propyl-1,3-propanediamine with hexafluoroacetone. The formula of the product is shown in Table I.

EXAMPLE 45

Compound 40 was prepared by reacting 3-N-ethylaminopropionitrile with hexafluoroacetone. The formula of the product is shown in Table I.

EXAMPLE 46

Compound 41 was prepared by reacting 1,1-dimethyl-2-phenoxyethylamine with hexafluoroacetone. The formula of the product is shown in Table I.

EXAMPLE 47

Compound 42 was prepared by reacting N,N'-dimethyl-1,3-propanediamine with hexafluoroacetone. The formula of the product is shown in Table I.

EXAMPLE 48

Compound 43 was prepared by reacting 2-amino-2-methylpropyl phenyl sulfide with hexafluoroacetone. The formula of the product is shown in Table I.

EXAMPLE 49

Compound 44 was prepared by reacting N-(2-aminoethyl)-indole with hexafluoroacetone. The formula of the product is shown in Table I.

EXAMPLE 50

Compound 45 was prepared by reacting N-(2-aminoethyl)-piperazine with hexafluoroacetone. The formula of the product is shown in Table I.

EXAMPLE 51

Compound 46 was prepared by reacting N'-(1,1-dimethyl-2-phenoxyethyl)-2-methyl-1,2-propanediamine with hexafluoroacetone. The formula of the product is shown in Table I.

EXAMPLE 52

Compound 47 was prepared by reacting 2-benzyloxyethylamine with hexafluoroacetone. The formula of the product is shown in Table I.

EXAMPLE 53

Compound 48 was prepared by reacting 2-aminobenzothiazole with hexafluoroacetone. The formula of the product is shown in Table I.

EXAMPLE 54

Compound 49 was prepared by reacting 2-aminobutylphenyl sulfide with hexafluoroacetone. The formula of the product is shown in Table I.

EXAMPLE 55

Compound 50 was prepared by reacting N-(1-methylhexyl)-1,3-propanediamine with hexafluoroacetone. The formula of the product is shown in Table I.

EXAMPLE 56

Compound 51 was prepared by reacting N-aminohexamethylenimine with hexafluoroacetone. The formula of the product is shown in Table I.

EXAMPLE 57

Compound 52 was prepared by reacting 2-aminopropyl phenyl sulfide with hexafluoroacetone. The formula of the product is shown in Table I.

EXAMPLE 58

Compound 53 was prepared by reacting 2-methoxyethylamine with hexafluoroacetone. The formula of the product is shown in Table I.

EXAMPLE 59

Compound 54 was prepared by reacting 2-ethoxyethylamine with hexafluoroacetone. The formula of the product is shown in Table I.

EXAMPLE 60

Compound 55 was prepared by reacting 2-aminoethyl 2-methyl-4-t-butylphenyl sulfide with hexafluoroacetone. The formula of the product is shown in Table I.

EXAMPLE 61

Compound 56 was prepared by reacting 2-aminoethyl pentachlorophenyl sulfide with hexafluoroacetone. The formula of the product is shown in Table I.

EXAMPLE 62

Compound 57 was prepared by reacting 1-methoxy-2-propylamine with hexafluoroacetone. The formula of the product is shown in Table I.

EXAMPLE 63

Compound 58 was perpared by reacting 2-aminoethyl p-acetamidophenyl sulfide with hexafluoroacetone. The formula of the product is shown in Table I.

EXAMPLE 64

Compound 59 was prepared by reacting 2-aminobenzothiazole with chloral. The formula of the product is shown in Table I.

EXAMPLE 65

Compound 60 was prepared by reacting 2-amino-2-thiazoline wth chloral. The formula of the product is shown in Table I.

TABLE I(a)

Compound:
1 ............ 2-[3-(dimethylamino)propylamino]-hexafluoro-2-propanol.
2 ............ 2-diethylamine-hexafluoro-2-propanol.
3 ............ Hexafluoro-2-(3-methoxypropylamino)-2-propanol.
4 ............ Hexafluoro-2-[3-(N-morpholinyl)propylamino]-2-propanol.
5 ............ Hexafluoro-2-{3-[bis(2-hydroxyethyl)amino]propylamino}-2-propanol.
6 ............ Hexafluoro-2-{3-[1'-(4'-methyl)piperazinyl]propylamino}-2-propanol.
7 ............ Hexafluoro-2-[3-(N-piperidyl)propylamino]-2-propanol.
8 ............ 2-[2-(diethylamino)ethylamino]-hexafluoro-2-propanol.
9 ............ 2-[3-(1,1-dimethylethylamino)propylamino]-hexafluoro-2-propanol.
10 ........... 2-[2-(dimethylamino)ethylamino]-hexafluoro-2-propanol.
11 ........... Hexafluoro-2-[1'-(4'-methyl)piperazinyl]-2-propanol:
12 ........... 2-[3-(diethylamino)propylamino]-hexafluoro-2-propanol.
13 ........... Hexafluoro-2-(3-tridecyloxypropylamino)-2-propanol.
14 ........... Hexafluoro-2-[2-(phenylamino)ethylamino]-2-propanol.
15 ........... Hexafluoro-2-[2-(methylamino)ethylamino]-2-propanol.
16 ........... 2-[3-(dimethylamino)propylamino]-1,1,1-trifluoro-2-propanol.
17 ........... Hexafluoro-2-N-morpholinyl-2-propanol.
18 ........... 2-[2-(ethylamino)ethylamino]-hexafluoro-2-propanol.
19 ........... Hexafluoro-2-{2-[bis(1-methylethyl)amino]ethylamino{-2-propanol.
20 ........... Hexafluoro-2-[2-(propylamino)ethylamino]-2-propanol.
21 ........... Hexafluoro-2-[2-(1-methylethyl)amino)ethylamino]-2-propanol.
22 ........... 2-[3-ethylamino) propylamino]-hexafluoro-2-propanol.
23 ........... Hexafluoro-2-[3-(1-methylethyl)amino)propylamino]-2-propanol.
24 ........... Hexafluoro-2-[3-(methylamino)propylamino]-2-propanol.
25 ........... 2-[N-methyl-2-(diethylamino)ethylamino]-hexafluoro-2-propanol.
26 ........... 2-[2-(dimethylamino)-1-methylethylamino]-hexafluoro-2-propanol.
27 ........... Hexafluoro-2-[2-(N-morpholinyl)ethylamino]-2-propanol.
28 ........... 2-(2-diethylamino-2,2-dimethylethylamino)-hexafluoro-2-propanol.

29 .......... 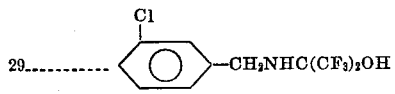

30 .......... 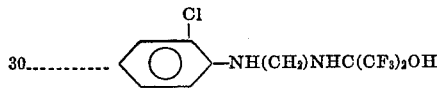

31 .......... 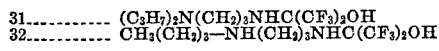
32 ..........

33 .......... 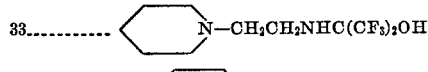

34 .......... 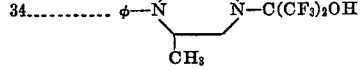

35 .......... 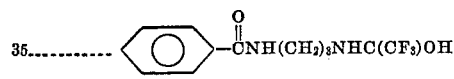

TABLE I(a)—Continued

| Compound: | |
|---|---|
| 36 | (CH₃)₂N—CH—CH₂NHC(CF₃)₂OH<br>　　　　　｜<br>　　　　　CH₃ |
| 37 | CH₃O(CH₂)₃NHC(CF₃)(OH)—CClF₂ |
| 38 | CH₃C(=O)—N(CH₃)—(CH₂)₃NHC(CF₃)₂OH |
| 39 | C₃H₇NH(CH₂)₃NHC(CF₃)₂OH |
| 40 | N≡C—CH₂CH₂—N(CH₃CH₂)—C(CF₃)₂OH |
| 41 | C₆H₅—OCH₂C(CH₃)₂—NHC(CF₃)₂OH |
| 42 | CH₃NH(CH₂)₃N(CH₃)—C(CF₃)₂OH |
| 43 | C₆H₅—SCH₂C(CH₃)₂—NHC(CF₃)₂OH |
| 44 | indol-1-yl—CH₂CH₂NHC(CF₃)₂OH |
| 45 | H—N(piperazine)N—CH₂CH₂NHC(CF₃)₂OH |
| 46 | C₆H₅—OCH₂—C(CH₃)₂—NHCH₂C(CH₃)₂—NHC(CF₃)₂OH |
| 47 | C₆H₅—CH₂OCH₂CH₂NHC(CF₃)OH |
| 48 | benzothiazol-2-yl—NHC(CF₃)₂OH |
| 49 | C₆H₅—SCH₂CH(CH₂CH₃)NHC(CF₃)₂OH |
| 50 | C₅H₁₁CH(CH₃)NH(CH₂)₃NHC(CF₃)₂OH |
| 51 | piperidin-1-yl—NHC(CF₃)₂OH |
| 52 | C₆H₅—SCH₂CH(CH₃)NHC(CF₃)₂OH |
| 53 | CH₃OCH₂CH₂NHC(CF₃)₂OH |
| 54 | C₂H₅OCH₂CH₂NHC(CF₃)₂OH |
| 55 | (CH₃)₃C—C₆H₃(CH₃)—SCH₂CH₂NHC(CF₃)₂OH |
| 56 | Cl₅C₆—SCH₂CH₂NHC(CF₃)₂OH |

TABLE I(a)—Continued

Compound:

57 -------- CH₃OCH₂CHNHC(CF₃)₂OH
              |
              CH₃

58 -------- 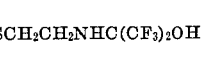

59 -------- 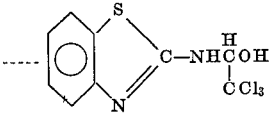

60 -------- 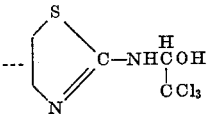

TABLE I(b)

| Compound | Physical State, S=solid; L=liquid | Melting Point, °C |
|---|---|---|
| 1 | S | 62.5–63.5 |
| 2 | S | 94.5 |
| 3 | S | 73.5–74 |
| 4 | S | 69.5 |
| 5 | L | |
| 6 | L | |
| 7 | L | |
| 8 | L | |
| 9 | L | |
| 10 | S | 96.5–97.5 |
| 11 | S | 119–124 |
| 12 | L | |
| 13 | L | |
| 14 | S | 185–189 |
| 15 | S | 69–71 |
| 16 | S | |
| 17 | S | 105–110 |
| 18 | S | 87–88.5 |
| 19 | S | 41–43 |
| 20 | S | 71–72.5 |
| 21 | S | 42.5–46 |
| 22 | S | 69–72 |
| 23 | S | 92–94 |
| 24 | S | 127–129 |
| 25 | S | 89–93 |
| 26 | L | |
| 27 | S | 145–146 |
| 28 | S | 70–73 |
| 29 | L | |
| 30 | L | |
| 31 | L | |
| 32 | S | 87–90 |
| 33 | L | |
| 34 | S | 84–88 |
| 35 | L | |
| 36 | S | 34–35 |
| 37 | L | |
| 38 | L | |
| 39 | Viscous Oil | |
| 40 | S | 66–68 |
| 41 | S | 71–74 |
| 42 | S | 147–148 |
| 43 | S | 37–39 |
| 44 | L | |
| 45 | S | 113–114 |
| 46 | L | |
| 47 | S | 58–61 |
| 48 | S | 64.5–70 |
| 49 | S | 49–51 |
| 50 | L | |
| 51 | L | |
| 52 | Viscous Oil | |
| 53 | S | 62–73 |
| 54 | S | 58–61 |
| 55 | L | |
| 56 | S | 69.5–75 |
| 57 | S | 54–55 |
| 58 | S | 100–104 |
| 59 | S | ¹ 130–135 |
| 60 | S | 110–115 |

¹ Decomposed.

EXAMPLE 66

The compound listed in Table I were tested for activity as pre-emergence and post-emergence herbicides. To test for pre-emergence activity, a flat bed seeded with three broad leaf plants: turnips, buckwheat, and aster; and three grasses: millet, perennial rye grass, and sorghum, was sprayed with a formulation containing the compound at a rate equivalent to 10 lbs. per acre. The flats were then held in the greenhouse and the response rated after a period of 12 to 16 days. For the post-emergence tests, the same procedure was followed except that plants were not sprayed until the first true leaves had appeared on all the plants. As in the pre-emergence test, the plant responses were rated 12 to 16 days after treatment. The phytotoxicity ratings for each of the compounds appear in Table II. The numbered compounds in Table II correspond to those numbered in Table I.

TABLE II.—POST- AND PRE-EMERGENCE HERBICIDE TESTS (10 LBS./ACRE)
Phytotoxicity Ratings *

| Compound | Millet | | Rye Grass | | Sorgum | | Aster | | Buckwheat | | Turnip | |
|---|---|---|---|---|---|---|---|---|---|---|---|---|
| | Post | Pre | Post | Pre | Post | Pre | Post | Pre | Post | Pre | Post | Pre |
| 1 | 4 | 5 | 4 | 5 | 4 | 5 | 4 | 5 | 5 | 5 | 3 | 3 st. |
| 2 | 3 | 5 | 3 | 4 | 3 | 5 | 3 | 5 | 3 | 5 | 3 | 2 st. |
| 3 | 5 | 5 | 5 | 5 | 5 | 5 | 4 | 4 | 4 | 3 | 3 | 3 st. |
| 4 | 3 | 5 | 3 | 5 | 3 | 5 | 4 | 3 | 3 | 3 st. | 3 | 2 st. |
| 5 | 4 | 4 | 4 | 4 | 4 | 4 | 4 | 4 | 4 | 3 | 4 | 4 |
| 6 | 4 | 5 | 4 | 5 | 4 | 5 | 5 | 5 | 4 | 4 | 5 | 5 |
| 7 | 4 | 5 | 4 | 4 | 4 | 5 | 4 | 4 | 3 | 4 | 3 | 2 st· |
| 8 | 4 | 5 | 4 | 5 | 4 | 5 | 3 | 5 | 3 | 4 | 2 | 2 st. |
| 9 | 2 | 4 st. | 2 | 4 st. | 2 | 4 st. | 2 | 3 st. | 2 | 3 st. | 1 | 1 |
| 10 | 3 | 5 | 3 | 4 st. | 3 | 5 | 2 | 3 st. | 3 st. | 5 | 3 | 2 st. |

TABLE II.—Continued. POST- AND PRE-EMERGENCE HERBICIDE TESTS (10 LBS./ACRE)

Phytotoxicity Ratings *

| | Millet | | Rye Grass | | Sorgum | | Aster | | Buckwheat | | Turnip | |
|---|---|---|---|---|---|---|---|---|---|---|---|---|
| | Post | Pre | Post | Pre | Post | Pre | Post | Pre | Post | Pre | Post | Pre |
| 11 | 3 | 4 st. | 3 | 4 st. | 3 | 5 | 2 | 3 st. | 2 st. | 5 | 2 | 3 st. |
| 12 | 3 | 5 | 3 | 4 st. | 3 | 5 | 2 | 2 st. | 4 | 3 st. | 2 | 1 st. |
| 13 | 3 | 4 st. | 3 | 4 st. | 3 | 4 st. | 3 | 3 st. | 3 | 3 st. | 3 | 2 st. |
| 14 | 4 | 5 | 4 | 5 | 4 | 5 | 5 | 5 | 4 | 5 | 3 | 2 st. |
| 15 | 4 | 5 | 4 | 5 | 4 | 5 | 3 | 5 | 3 | 5 | 2 | 3 st. |
| 16 | 1 | 3 | 1 | 3 | 1 | 3 | 1 | 1 | 1 | 1 | 1 | 1 |
| 17 | 4 | 5 | 4 | 5 | 4 | 4 st. | 2 | 3 | 3 | 5 | 1 | 1 |
| 18 | 5 | 5 | 5 | 5 | 4 | 5 | 3 | 2 st. | 3 | 5 | 1 | 1 |
| 19 | 3 | 5 | 3 | 4 st. | 3 | 4 st. | 3 | 3 st. | 3 | 4 | 1 | 1 |
| 20 | 4 | 5 | 4 | 5 | 4 | 5 | 2 | 3 st. | 5 | 3 st. | 2 | 2 st. |
| 21 | 3 | 5 | 4 | 5 | 3 | 5 | 2 | 4 st. | 4 | 5 | 2 | 3 st. |
| 22 | 4 | 5 | 4 | 5 | 4 | 5 | 3 | 5 | 3 | 5 | 2 | 3 st. |
| 23 | 4 | 5 | 4 | 5 | 4 | 4 st. | 3 | 3 st. | 4 | 3 st. | 2 | 3 st. |
| 24 | 3 | 5 | 3 | 5 | 3 | 5 | 3 | 4 st. | 5 | 5 | 2 | 3 st. |
| 25 | 4 | 5 | 4 | 5 | 4 | 5 | 3 | 4 st. | 4 | 3 st. | 2 | 2 st. |
| 26 | 4 | 5 | 4 | 5 | 4 | 5 | 2 | 3 st. | 4 | 5 | 2 | 3 st. |
| 27 | 3 | 4 st. | 3 | 4 st. | 3 | 4 st. | 2 | 2 | 4 | 3 | 2 | 2 st. |
| 28 | 4 | 4 st. | 4 | 4 st. | 4 | 4 st. | 2 | 2 | 3 | 4 | 2 | 1 |
| 29 | 4 | 5 | 4 | 5 | 4 | 5 | 4 | 5 | 4 | 5 | 3 st. | 3 st. |
| 30 | 4 | 5 | 4 | 5 | 4 | 5 | 2 | 4 | 3 | 5 | 2 st. | 3 st. |
| 31 | 4 | 5 | 4 | 5 | 4 | 5 | 4 | 5 | 4 | 5 | 3 st. | 4 |
| 32 | 5 | 5 | 5 | 5 | 5 | 5 | 4 | 4 | 4 | 5 | 3 st. | 3 st. |
| 33 | 4 | 5 | 3 | 5 | 4 | 5 | 2 | 4 | 2 st. | 5 | 2 st. | 3 st. |
| 34 | 3 | 5 | 3 | 5 | 3 | 5 | 2 | 5 | 3 | 5 | 2 st. | 3 st. |
| 35 | 4 | 4 | 4 | 4 | 4 | 4 | 5 | 5 | 4 | 4 | 5 | 5 |
| 36 | 5 | 5 | 5 | 5 | 5 | 5 | 4 | 5 | 5 | 5 | 2 st. | 4 st. |
| 37 | 4 | 4 | 3 | 4 | 4 | 4 | 5 | 4 | 5 | 4 | 4 | 3 st. |
| 38 | 4 | 5 | 4 | 5 | 4 | 4 | 3 | 4 | 5 | 5 | 3 | 3 st. |
| 39 | 5 | 5 | 5 | 5 | 5 | 5 | 4 | 4 | 5 | 4 | 3 st. | 3 st. |
| 40 | 5 | 5 | 5 | 5 | 5 | 5 | 4 | 4 | 5 | 5 | 3 st. | 3 st. |
| 41 | 4 | 5 | 5 | 5 | 4 | 5 | 4 | 5 | 5 | 5 | 3 st. | 3 st. |
| 42 | 4 | 5 | 4 | 5 | 4 | 5 | 4 | 5 | 5 | 5 | 3 st. | 3 st. |
| 43 | 5 | 5 | 4 | 5 | 4 | 5 | 4 | 4 | 4 | 5 | 4 | 2 st. |
| 44 | 2 | 3 st. | 2 | 3 st. | 2 | 3 st. | 1 | 1 | 1 | 1 | 1 | 1 |
| 45 | 4 | 4 | 3 | 4 | 3 | 4 | 4 | 3 | 5 | 5 | 1 st. | 1 |
| 46 | 3 | 4 | 3 | 4 | 3 | 4 | 3 | 5 | 5 | 5 | 2 | 1 |
| 47 | 4 | 4 | 2 | 4 | 4 | 4 | 3 | 4 | 4 | 5 | 1 | 2 |
| 48 | 4 | 4 | 4 | 4 | 4 | 4 | 3 | 5 | 4 | 5 | 2 | 1 |
| 49 | 3 | 4 | 3 | 4 | 3 | 4 | 3 | 4 | 4 | 4 | 2 | 1 |
| 50 | 4 | 4 | 3 | 4 | 4 | 4 | 2 | 1 | 2 | 2 | 2 | 1 |
| 51 | 3 | 5 | 3 | 4 | 3 | 4 | 3 | 5 | 3 | 5 | 2 | 1 st. |
| 52 | 3 | 4 | 3 | 4 | 3 | 4 | 3 | 5 | 3 | 5 | 3 | 2 |
| 53 | 4 | 5 | 3 | 4 | 4 | 5 | 3 | 4 | 3 | 5 | 3 | 2 st. |
| 54 | 3 | 4 | 3 | 4 | 3 | 4 | 2 | 3 | 3 | 3 | 2 | 1 |
| 55 | 3 | 4 | 3 | 4 | 3 | 4 | 3 | 3 | 4 | 4 | 2 | 1 |
| 56 | 3 | 4 | 3 | 4 | 3 | 4 | 3 | 4 | 4 | 4 | 2 | 2 st. |
| 57 | 3 | 4 | 3 | 5 | 3 | 4 | 5 | 5 | 5 | 5 | 3 | 1 st. |
| 58 | 3 | 4 | 3 | 5 | 3 | 4 | 3 | 5 | 5 | 5 | 2 | 1 st. |

* Rating key:
 1=no injury or normal stand.
 2=slight injury or slight reduction in stand.
 3=moderate injury or moderate reduction in stand.
 4=severe injury or severe reduction in stand.
 5=all plants killed or no stand.
 st.=stunting.

EXAMPLE 67

Many of the compounds listed in Table I were also tested as fungicides. Bean mildew and bean rust tests were performed. For the bean rust test, pinto bean plants with fully expanded primary leaves were inoculated with spores of the bean rust fungus *Uromyces phaseoli* and the incubated for 24 hours. The compounds of this invention were then applied at a concentration of 1000 parts per million. After the spray had dried, the plants were removed to the greenhouse and held for a period of 7 to 10 days, at the end of which time the amount of rust was rated.

For the bean mildew test, tender green bean plants with fully expanded primary leaves were inoculated with spores of the powdery mildew fungus *Erysiphe polygoni* 48 hours prior to application of test chemicals. Various compounds were then applied at a concentration of 1000 and 500 parts per million. After the spray had dried, the plants were removed to the green house and held for a period of 7 to 10 days, at the end of which time the amount of mildew on the primary leaves was rated. The results of the bean rust test appear in Table III and the results of the primary bean mildew test appear in Table IV. The results are particularly interesting because the fungicides were used to eradicate fungi, not merely to protect uncontaminated plants.

TABLE III.—(FUNGICIDE [1])—PRIMARY BEAN RUST TEST (1,000 p.p.m.)

| Compound | Control Rating | Compound | Control Rating |
|---|---|---|---|
| 2 | 5 | 31[2] | 5 |
| 3 | 5 | 32[2] | 5 |
| 4 | 5 | 33[2] | 5 |
| 7 | 4 | 34[2] | 5 |
| 8 | 4 | 36[2] | 5 |
| 9 | 5 | 37[2] | 5 |
| 10 | 5 | 38[2] | 5 |
| 11 | 5 | 39[2] | 5 |
| 12 | 5 | 41[2] | 5 |
| 13 | 5 | 42[2] | 5 |
| 14 | 5 | 43[2] | 5 |
| 15 | 5 | 44[2] | 5 |
| 17 | 5 | 45[2] | 5 |
| 18 | 5 | 46[2] | 5 |
| 19 | 5 | 47[2] | 5 |
| 20 | 5 | 48[2] | 5 |
| 21 | 5 | 49[2] | 5 |
| 22 | 5 | 50[2] | 5 |
| 23 | 5 | 51[2] | 5 |
| 24 | 5 | 52[2] | 5 |
| 25 | 5 | 53[2] | 5 |
| 26 | 5 | 54[2] | 5 |
| 27 | 5 | 55[2] | 5 |
| 28 | 5 | 56[2] | 5 |
| 29[2] | 5 | 57[2] | 5 |
| 30[2] | 5 | 58[2] | 5 |

See footnotes at end of Table IV.

TABLE IV.—(FUNGICIDE [1])—PRIMARY BEAN MILDEW TEST
(1,000 p.p.m.)

| Compound | Control Rating | Compound | Control Rating |
| --- | --- | --- | --- |
| 2 | 5 | 22 | 4 |
| 3 | 4 | 23 | 5 |
| 4 | 4 | 24 | 5 |
| 7 | 4 | 39 [2] | 4 |
| 12 | 4 | 56 [2] | 5 |
| 15 | 4 | | |

[1] Rating key for bean rust and mildew:
1=no control.
2=slight control.
3=moderate control.
4=good control (a few scattered spots per leaf).
5=100% control.

[2] At 500 p.p.m.

It is thus seen that the compounds of this invention are useful as contact and pre-emergence weed killers. In addition, the compounds are good fungicides. When used as an herbicide, the compounds should be employed at a dosage level of about ½ to 20 lbs. per acre, preferably from ½ to 5 lbs. per acre.

The herbicides of this invention may be applied directly to the vegetation to be treated and are particularly effective as pre-emergence herbicides, in which case they are applied within a period of from just before the crop is planted to a time just after planting. It is preferred, however, to incorporate the active ingredient in a liquid or solid diluent. The liquid diluent may be a solvent for the active ingredient or the active ingredient may be dispersed in the liquid diluent; thus, the compounds can be formulated as water-dispersable powders or as emulsifiable concentrates or dilute solutions in an organic hydrocarbon solvent. Suitable organic hydrocarbon solvents include fuel oils, petroleum naphthas and the like. The solutions or dispersions may contain the active ingredient in an amount greater than ½ lb. per 100 gallons of dispersion or solution.

In addition, the active ingredient may be impregnated on a suitable solid diluent. Such diluents include diatomaceous earth, silica gels, and the like.

Various conventional wetting, dispersing and emulsifying agents may be added to the herbicidal formulations in order to enhance the wetting effect and produce improved dispersion of the active ingredient on the vegetation to which it is applied. Any of the known types of spraying or dusting apparatus may be employed for applying the herbicide to the vegetation to be treated.

The herbicides of the present invention are applied to the area to be treated in an amount sufficient to obtain the degree of control of vegetation desired. The optimum intensity of application of the desired herbicide will depend on such factors as amount of vegetation in the area, degree of tolerance of the crop, degree of resistance to treatment of the undesired plant, climatic conditions and soil conditions, particularly organic matter content of the soil.

The invention has been described with a certain degree of particularity. Various modifications can be made without departing from the scope of this invention.

What is claimed is:

1. Compounds having the following structure:

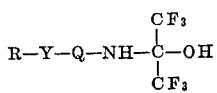

wherein R is selected from the group consisting of hydrogen, $C_1$ to $C_{20}$ alkyl, phenyl and chloro-substituted phenyl; Y is selected from the group consisting of O, S and $NR_1$ wherein $R_1$ is hydrogen or an alkyl containing from 1 to 4 carbon atoms; Q is $C_nH_{2n}$ wherein $n$ equals 2, 3 or 4.

2. Compounds having the following structure:

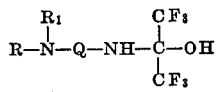

wherein R is selected from hydrogen and $C_1$ to $C_{20}$ alkyl, phenyl and chloro-substituted phenyl; Q is $C_nH_{2n}$ wherein $n$ equals 2, 3 or 4.

3. Compounds having the following structure:

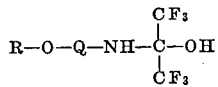

wherein R is selected from the group consisting of hydrogen, $C_1$ to $C_{20}$ alkyl, phenyl and chloro-substituted phenyl; Q is $C_nH_{2n}$ wherein $n$ equals 2, 3 or 4.

4. Compounds having the following structure:

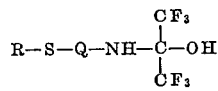

wherein R is selected from the group consisting of hydrogen, $C_1$ to $C_{20}$ alkyl, phenyl and chloro-substituted phenyl; Q is $C_nH_{2n}$ wherein $n$ equals 2, 3 or 4.

5. A compound according to claim 2 wherein the specific compound is hexafluoro-2-[2-(phenylamino)-ethylamino]-2-propanol.

6. A composition according to claim 2 wherein the specific compound is 2-[3-(dimethylamino)propylamino]-hexafluoro-2-propanol.

7. A compound according to claim 2 wherein the specific compound is

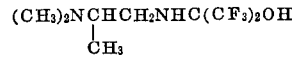

8. A compound according to claim 3 wherein the specific compound is $H_3CO(CH_2)_3NHC(CF_3)_2OH$.

9. A compound according to claim 3 wherein the specific compound is $C_{13}H_{27}O(CH_2)_3NHC(CF_3)_2OH$.

10. A compound according to claim 3 wherein the specific compound is

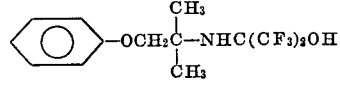

11. A compound according to claim 3 wherein the specific compound is

12. A compound according to claim 4 wherein the specific compound is

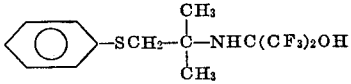

13. A compound according to claim 4 wherein the specific compound is

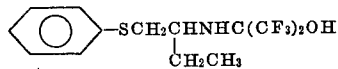

14. A compound according to claim 4 wherein the specific compound is

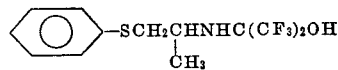

15. A compound according to claim 4 wherein the specific compound is
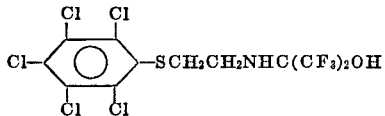
References Cited
UNITED STATES PATENTS
| | | | |
|---|---|---|---|
| 2,585,230 | 2/1952 | Coover et al. | 260—583 X |
| 3,226,439 | 12/1965 | Middletown | 260—584 X |
| 3,401,164 | 9/1968 | Brois | 260—239 |
CHARLES B. PARKER, Primary Examiner
R. L. RAYMOND, Assistant Examiner
U.S. Cl. X.R.
71—88, 90, 92, 94, 96, 98, 105, 118, 121; 260—239, 247.5, 247.7, 268, 293, 294.7, 305, 306.7, 326.15, 465.5, 556, 558, 561, 562, 563, 570.6, 570.7, 583, 584, 593, 601; 424—244, 248, 250, 267, 270, 304, 320, 321, 324, 325, 330